US010576540B2

(12) United States Patent
Dellea et al.

(10) Patent No.: US 10,576,540 B2
(45) Date of Patent: Mar. 3, 2020

(54) METHOD AND MACHINE FOR ADDITIVE MANUFACTURING REDUCING RISKS OF POWDER DISSEMINATION DURING MANIPULATIONS

(71) Applicant: COMMISSARIAT A L'ENERGIE ATOMIQUE ET AUX ENERGIES ALTERNATIVES, Paris (FR)

(72) Inventors: Olivier Dellea, La Talaudiere (FR); Philippe Berne, Grenoble (FR); Pascal Revirand, Saint Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 768 days.

(21) Appl. No.: 15/220,799

(22) Filed: Jul. 27, 2016

(65) Prior Publication Data
US 2017/0028468 A1    Feb. 2, 2017

(30) Foreign Application Priority Data

Jul. 28, 2015  (FR) ...................... 15 57202

(51) Int. Cl.
*B22F 1/00*      (2006.01)
*B22F 3/105*     (2006.01)
(Continued)

(52) U.S. Cl.
CPC .......... *B22F 1/0081* (2013.01); *B22F 1/0088* (2013.01); *B22F 3/005* (2013.01);
(Continued)

(58) Field of Classification Search
CPC ...... B22F 1/0088; B22F 3/005; B22F 3/1055; B22F 3/24; B22F 1/0081;
(Continued)

(56) References Cited

U.S. PATENT DOCUMENTS

| 5,658,412 A | 8/1997 | Retallick et al. |
| 2013/0344258 A1* | 12/2013 | Covey ..................... C23C 18/14 |
| | | 427/586 |

FOREIGN PATENT DOCUMENTS

| EP | 0 296 552 A1 | 12/1988 |
| EP | 1 700 686 A2 | 9/2006 |

(Continued)

OTHER PUBLICATIONS

French Preliminary Search Report dated Jun. 6, 2016 in French Application 15 57202 filed on Jul. 28, 2015 (with English Translation of Categories of Cited Documents).

*Primary Examiner* — Daniel C. McCracken
(74) *Attorney, Agent, or Firm* — Oblon, McClelland, Maier & Neustadt, L.L.P.

(57) ABSTRACT

An additive manufacturing method and machine for an object using at least one powder, capable of limiting risks of dissemination of the powder. The method including the following steps in succession: manufacture a solid block starting from the powder and a sublimatable material, load the solid block in a loading space of the machine; sublimate the material present in the solid block and recover the powder; and additive manufacturing of the object by stacking successive layers made using the powder recovered in the previous step.

20 Claims, 6 Drawing Sheets

(51) Int. Cl.
  *B22F 3/00* (2006.01)
  *B22F 3/24* (2006.01)
  *B29C 64/40* (2017.01)
  *B29C 64/35* (2017.01)
  *B29C 64/386* (2017.01)
  *B29C 64/153* (2017.01)
  *B29C 64/20* (2017.01)
  *B33Y 10/00* (2015.01)
  *B33Y 30/00* (2015.01)
  *B33Y 40/00* (2015.01)
  *B33Y 50/02* (2015.01)
  *B33Y 70/00* (2015.01)
  *B29C 39/02* (2006.01)
  *B28B 1/00* (2006.01)
  *B29K 105/16* (2006.01)
  *B29K 105/00* (2006.01)

(52) U.S. Cl.
  CPC .............. *B22F 3/1055* (2013.01); *B22F 3/24* (2013.01); *B29C 39/02* (2013.01); *B29C 64/153* (2017.08); *B29C 64/20* (2017.08); *B29C 64/35* (2017.08); *B29C 64/386* (2017.08); *B29C 64/40* (2017.08); *B33Y 10/00* (2014.12); *B33Y 30/00* (2014.12); *B33Y 40/00* (2014.12); *B33Y 50/02* (2014.12); *B33Y 70/00* (2014.12); *B22F 2003/1056* (2013.01); *B22F 2003/1059* (2013.01); *B28B 1/001* (2013.01); *B29K 2105/16* (2013.01); *B29K 2105/251* (2013.01); *Y02P 10/295* (2015.11)

(58) Field of Classification Search
  CPC ..... B22F 2003/1056; B22F 2003/1059; B29C 39/02; B29C 64/153; B29C 64/20; B29C 64/386; B29C 64/40; B29C 64/35; B33Y 70/00; B33Y 50/02; B33Y 30/00; B33Y 10/00; B33Y 40/00; B28B 1/001; B29K 2105/251; B29K 2105/16; Y02P 10/295
  See application file for complete search history.

(56) References Cited

FOREIGN PATENT DOCUMENTS

| | | |
|---|---|---|
| WO | WO 2006/066939 A1 | 6/2006 |
| WO | WO 2009/027837 A2 | 3/2009 |

* cited by examiner

METHOD AND MACHINE FOR ADDITIVE MANUFACTURING REDUCING RISKS OF POWDER DISSEMINATION DURING MANIPULATIONS

TECHNICAL FIELD

This invention relates to the field of additive manufacturing of an object, also called 3D printing, by stacking successive layers of powder.

The invention relates particularly to the problem of powder dissemination while it is being manipulated.

STATE OF PRIOR ART

In the field of additive manufacturing of an object by stacking successive layers of powder, a first step is usually to load the powder in a special-purpose loading area in the machine used. The risk of powder dissemination is high while powder is manipulated during this loading operation. Such a risk also exists during the final step to unload the manufactured object, surrounded by unbonded powder. There are several disadvantages with such powder dissemination.

Firstly, powder particles emitted into the atmosphere cause a loss of material, that can be expensive. Secondly, this loss can cause an unwanted change in the composition. For example, this is the case when the manipulated powder is composed of a mix of different natures of powder, in which case the stoichemistry can be changed.

Powder dissemination can also be the cause of increased equipment maintenance. These powders deposited in the work environment can carry material that will foul the equipment. Consequently, specific maintenance actions can become necessary as a result of uncontrolled dissemination.

Finally, dissemination of powder can introduce risks for the health and safety of operators. For example, inhalation or skin contact with a powder deemed to be dangerous can have effects on health, causing irritations, allergies, disorders of the nervous system and even cancers. Even powders considered to be inert, in other words with no specific toxicity, can overload the lungs if they are present in large quantities, possibly associated with pulmonary fibrosis.

Several solutions such as dust collection installations have been disclosed in prior art to enable secure manipulation with regard to problems with dissemination or dusting of the powder. However, these solutions can be improved and are not necessarily suitable for the field of additive manufacturing by stacking successive layers of powder.

SUMMARY OF THE INVENTION

The first purpose of the invention to at least partly overcome the disadvantages of embodiments according to prior art, is an additive manufacturing method for an object using at least one powder, comprising the following steps in succession:
  manufacture a solid block starting from said powder and a sublimatable material;
  load the solid block in a loading space of an additive manufacturing machine;
  sublimate said material present in the solid block and recover said powder; and
  additive manufacturing of the object by stacking successive layers made using the powder recovered in the previous step.

The invention has the advantage that the powder is loaded in the form of a block made solid by the presence of the sublimatable material. The solid nature of the block containing the powder prevents dissemination of the powder at the time of loading into the additive manufacturing machine, which advantageously reduces material losses, unwanted variations in the composition of the powder loaded into this machine, equipment safety needs and health and safety risks.

The invention preferably has at least one of the following additional characteristics, taken in isolation or in combination.

The method comprises a step after the additive manufacturing step of the object, to partially or entirely coat an assembly composed of the unbonded powder and the object surrounded by this powder, the coating being made by a sublimatable material, preferably using all or some of said material recovered during said sublimation step. This specific feature can help to reduce risks of powder dissemination when the assembly containing the object is unloaded. In this respect, note that another source of sublimatable material could be used for the coating, without going outside the framework of the invention.

In order to make the coating, said material is applied around said assembly in the liquid state so as to impregnate said powder by capillarity, the application being made by direct application or by sprinkling, or said material is applied around said assembly by means of a spray, in other words a mechanical device capable of vaporising a liquid into fine droplets, this device also being known as an aerosol.

After the coating step, the coated assembly is extracted from the additive manufacturing machine and is transferred to another work station for extraction of said object, for example in a glove box inside which dissemination of the powder can easily be contained.

After said sublimation step, a step is carried out to recover said sublimated material using a cold trap. This recovery is done for reuse of the material for coating purposes as mentioned above, and/or for manufacturing new solid blocks that will be loaded into an additive manufacturing machine.

Said sublimatable material is preferably cyclododecane.

According to a first embodiment, said step to manufacture the solid block from said powder and said sublimatable material takes place as follows:
  mix said powder and material so as to obtain a non-powdery material;
  compact the mix at ambient temperature;
  melt said material on the external surface of the compacted mix, so as to obtain a solid external wall with a given thickness after cooling, said external wall of the solid block defining an internal cavity in which the remainder of the mix of said powder and said material are located.

According to a second embodiment, said step to manufacture the solid block from said powder and said sublimatable material takes place as follows:
  make a container using said material, said container comprising a body defining an internal cavity and en element to close said internal cavity;
  introduce the powder into the internal cavity;
  close the internal cavity using said closing element.

According to a third embodiment, said step to manufacture the solid block from said powder and said sublimatable material takes place as follows:
  bring said material in liquid form into a mould and then pour the powder into the mould containing the material in liquid form, or vice versa;

cool the material so as to obtain a solid block of material containing the powder.

According to a fourth embodiment, said step to manufacture the solid block from said powder and said sublimatable material takes place as follows:

place the powder in a mould;

impregnate the powder around the periphery, using a material in liquid form to a given thickness, so as to obtain a solid external wall after cooling over said given thickness, said external wall of the solid block defining an internal cavity in which the remainder of said powder is located.

Furthermore, said additive manufacturing step of the object is done using one of the following techniques:

Selective Laser Melting (SLM) or Electron Beam Melting (EBM);

Selective Laser Sintering (SLS) or selective electron beam sintering;

any other type of powder solidification technique under the action of a medium to high power energy source, the principle being to melt or sinter a powder bed by laser beam or electron beam, or projection of a binder on successive layers of powder.

Preferably, said powder is chosen from among:

metallic powders, for example titanium alloy, aluminium alloy, nickel alloy, superalloy, steel, stainless steel, refractory metal, precious metals, pure metals or in alloyed metals;

organic powders, for example polyamide, polyether block amide, polystyrene, polyetheretherketone (PEEK), polyaryletherketone (PAEK), polyamide containing aluminium;

inorganic powders, for example quartz, ceramic, calcium sulphate.

Obviously, mixes of these powders are possible without going outside the framework of the invention. The same applies for sublimatable materials that can also be mixed as will be mentioned below.

Another purpose of the invention is an additive manufacturing machine for implementation of the method described above, the machine comprising:

said loading space for the solid block containing the powder and the sublimatable material;

means of sublimating said material present in the solid block;

an additive manufacturing module; and means of recovering the powder recovered after sublimation of said material, and routing it to said module.

Preferably, the machine comprises means of recovering said sublimated material, said means including said cold trap.

Preferably, the machine comprises means of coating the assembly composed of unbonded powder and the object surrounded by this powder.

Other advantages and characteristics of the invention will become clear after reading the following detailed non-limitative description.

BRIEF DESCRIPTION OF THE DRAWINGS

This description will be made with reference to the appended drawings among which.

DETAILED DESCRIPTION OF PREFERRED EMBODIMENTS

Figure 1:
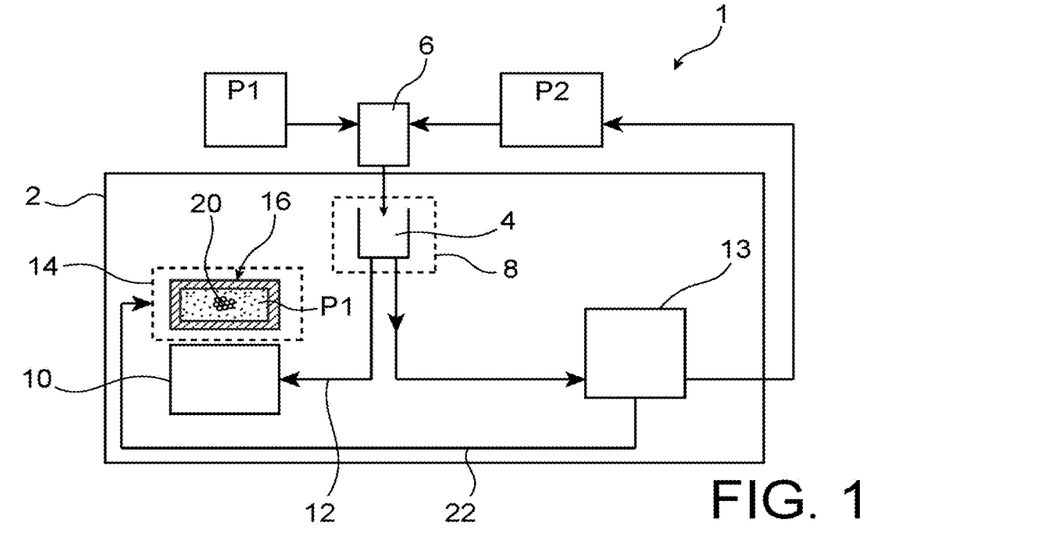
FIG. 1 shows a diagrammatic view of an additive manufacturing machine according to a preferred embodiment of the invention.

Firstly with reference to FIG. 1, the figure shows an additive manufacturing machine 1, also called a 3D printing machine, the machine 1 complying with a preferred embodiment of the invention.

The machine 1 is fitted with an external cover 2, made in a single piece or using several cladding elements added onto each other. These cladding elements 2 also comprise conventional doors (not shown) for loading the powder and for loading the object after manufacturing.

On FIG. 1, all elements represented inside the space defined by the cladding 2 must be considered as forming an integral part of the machine 1, that can be displaced/handled like a single piece of equipment.

The machine 1 comprises firstly a loading space 4 capable of containing one or several solid blocks 6, with a shape complementary to the shape of the loading space 4. As a minimum, the solid block 6 must be able to enter the loading space 4.

Each solid block 6 may be solid or hollow. It contains powder P1 that will be used for additive manufacturing of an object, and a sublimatable material P2 in sold form.

The nature of the powder P1 is determined as a function of the required composition for the object to be manufactured by 3D printing. As non-limitative examples, one of the following powders or a mix of at least two of these powders can be used:

metallic powders, for example titanium alloy, aluminium alloy, nickel alloy, superalloy, steel, stainless steel, refractory metal, precious metals or pure materials (Fe, Cu, Al, etc.);

organic powders, for example polyamide, polyether block amide, polystyrene, polyetheretherketone (PEEK), polyaryletherketone (PAEK), polyamide containing aluminium;

inorganic powders, for example quartz, ceramic, calcium sulphate, glass.

Cyclododecane ($C_{12}H_{24}$) is preferably chosen as the sublimatable material P2. Although obviously other materials can be envisaged, cyclododecane is the best choice for the invention due to its physical characteristics including:

- at ambient temperature (20° C.+/−5° C.), it is in the form of a white to translucid solid;
- melting temperature: between 58° C. and 60° C.;
- boiling temperature: 243° C.;
- vapour pressure: 0.1 hPa at 20° C.;
- sublimation enthalpy: 63.017-76.400 kJ $mol^{-1}$ 25° C.;

In particular, cyclododecane has the following advantages:

- vaporisation without the addition of solvent, due to its ability to sublimate;
- it may be in the form of a powder with large size grading, more than 10 μm;
- it can be easily moulded to obtain a particular form;
- it can be applied by spray, by liquid drops, or by direct dispensation;
- it acts like a consolidant, binder and coating;
- its sublimation rate and dynamics depend on several factors such as the temperature, pressure, density, structure of the material, thickness, surface condition, chemical composition (in this example, fixed at $C_{12}H_{24}$), the porosity, free volume, etc.;
- it has factors that sharply accelerate its sublimation, such as a temperature rise for example to 50° C., or strong ventilation and/or creation of a vacuum;
- it has factors that sharply decelerate its sublimation, such as freezing to between −15 and −20° C., saturation of the surrounding medium, cooling to between 5 and 10° C.;
- after sublimation, it is possible and easy to condense the material in a cold trap;
- it does not generate any surface pollution after sublimation.

All these advantages make this material perfectly adapted to implementation of the invention, particularly for manufacturing solid blocks 6, some examples of which will be described below with reference to FIGS. 3a to 6b.

Moreover, the additive manufacturing machine comprises means 8 of sublimation of said material present in the solid block 6. Example embodiments of these means 8 will be described with reference to FIGS. 7 and 8.

Figure 9:
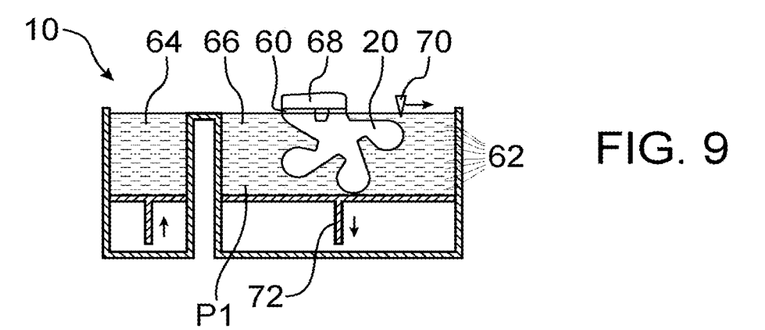
FIG. 9 shows a first example embodiment of a additive manufacturing model installed on the machine in FIG. 1.

The machine 1 also comprises an additive manufacturing module 10 with a classical design, some examples of which will be described below with reference to FIGS. 9 and 10. Means 12 will be inserted between means 8 and module 10. These means 12 comprising for example a blower and circulation channel for powder P1 are used to recover the powder P1 recovered during sublimation of material P2, performed with the solid block 6 placed in the loading space 4, and route it to module 10.

The machine 1 also comprises means 13 of recovering the sublimated material, these means comprising a cold trap so as to recover this material P2 in solid form.

Finally, the machine 1 comprises means 14 for coating an assembly 16 containing the unbonded powder P1 and the object obtained 20, surrounded by this powder, and possible a tray or support on which the object is built. An example embodiment of these means 14 will be described below with reference to FIG. 11. In this respect, note that the machine may also include communication means 22 to route the recovered material P2 from means 13 to the coating means 14.

Figure 2:
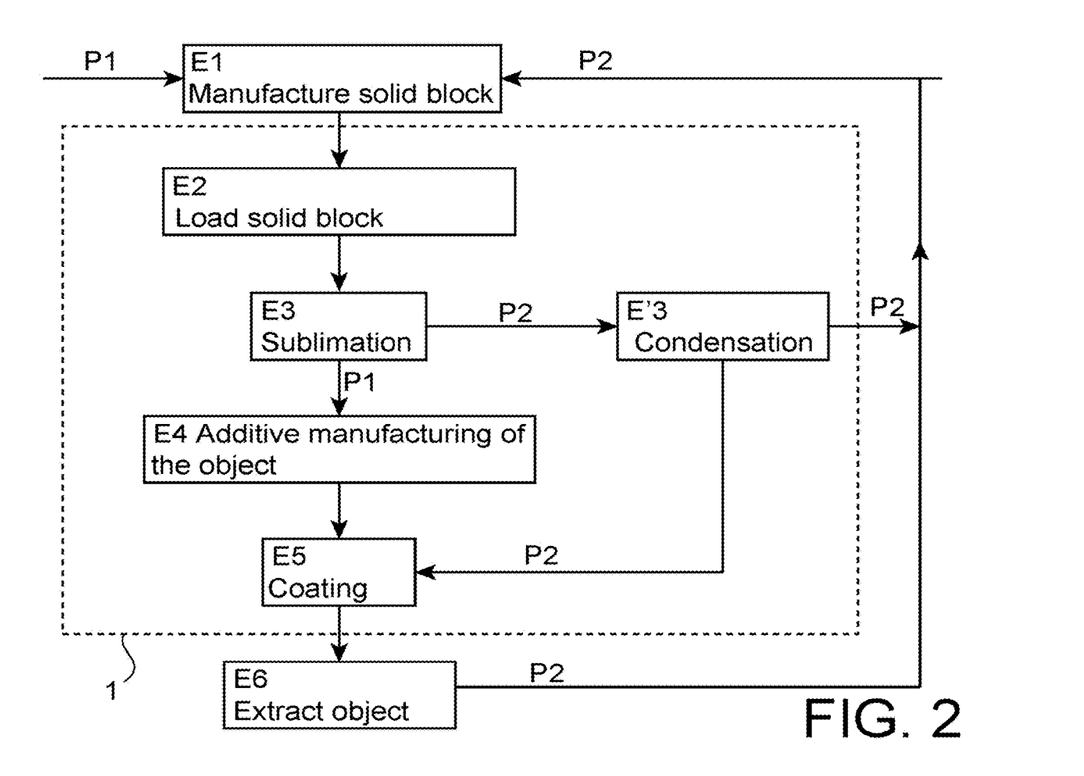
FIG. 2 is a view diagrammatically showing different steps in a method of additive manufacturing of an object, using the machine shown on the previous figure.

Now with reference to FIG. 2, the figure shows the sequence of steps in a method of manufacturing the object 20 using the machine 1. On this FIG. 2, the dotted line diagrammatically represents the machine 1, and all steps shown inside this dotted line must be considered as being made inside the machine, in an automated manner. These steps are classically controlled by a control unit that could be remote from the machine 1.

The method begins with a step E1, to manufacture a solid block 6. In this respect, a single solid block 6 is manufactured preferably with a shape complementary to the shape of the machine loading space 4. Nevertheless, several blocks 6 could be manufactured that, when superposed in the loading space 4, would have an assembled shape complementary to the shape of this space. This latter solution has an advantage, particularly when the composition of the required object can change, because it then becomes easy to manufacture blocks 6 using different powders before stacking these blocks in the machine loading space.

There are several possibilities for manufacturing solid blocks 6. Four example embodiments will now be described. However, it should be noted that these examples can possibly be combined, in that the steps described with reference to some examples may be applied to other examples, and vice versa.

Figure 3A:
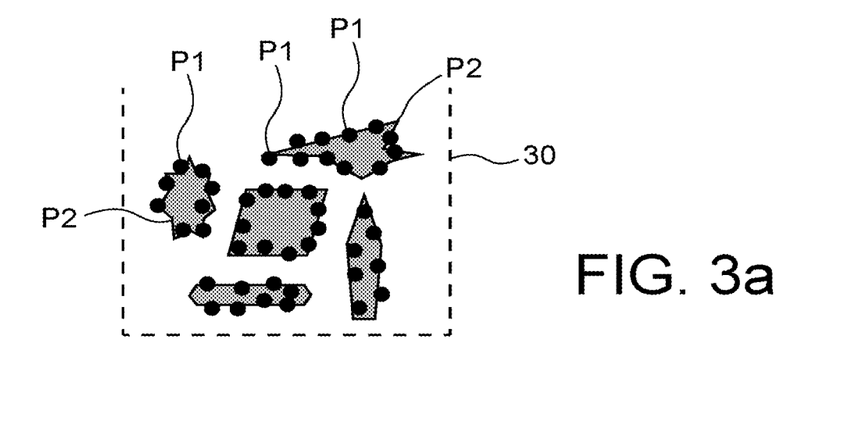
FIGS. 3a to 3c represent different successive steps in a first example of manufacturing a solid block including the powder and the sublimatable material.
Figure 3B:
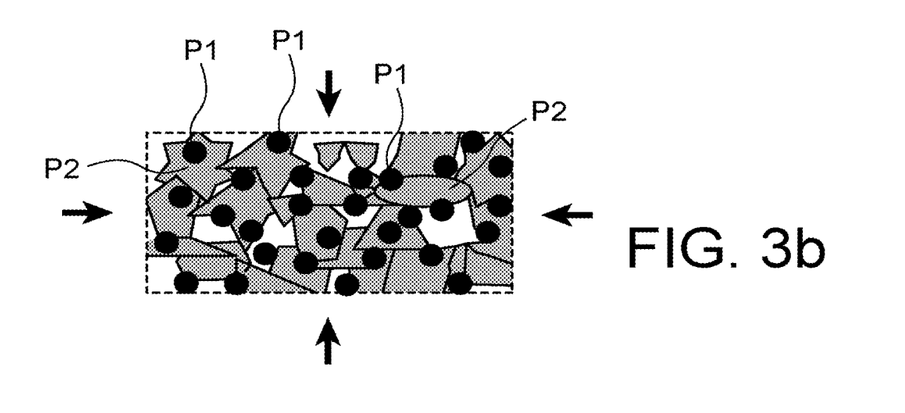
Figure 3C:
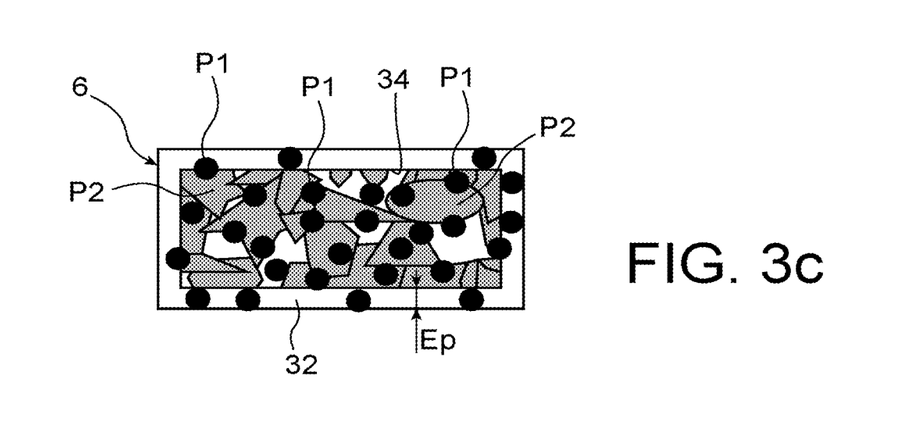

Firstly, a first example of manufacturing of a solid block 6 is shown with reference to FIGS. 3a to 3c. In this first example, the powder P1 is an $AlSi_{12}$, alloy with a size grading of the order of 30 μm. The sublimatable material P2 is cyclododecane in powder form, with a larger size grading, larger than 100 μm. The proportion by weight between powders P1 and P2 is of the order of 50-50. Note for information that the size grading of powder P2 is not necessarily larger than that of powder P1, all that is necessary is that the added material P2 is not dusty. Its size grading may then be larger or smaller than the size grading of the powder P1 considered.

The first step shown diagrammatically on FIG. 3a consists of mixing powders P1 and P2 at ambient temperature in a receptacle 30, so as to obtain a non-dusty mix. The grains of powders P1 and P2 are mixed for example by adsorption or based on any other physical principle.

Once the mix has been obtained, the mix is compacted at ambient temperature as shown diagrammatically on FIG. 3b. This compaction is made so as to obtain a shape practically identical to the final shape required for the block, and keeping sufficient porosity to facilitate the later sublimation step of the material P2.

As shown diagrammatically on FIG. 3c, manufacturing continues with an operation to melt material P2 at the external surface of the compacted mix, on a given thickness "Ep". This melting is done such that once the peripheral zone in which material P2 melted has cooled, a solid external wall 32 extends over the given thickness "Ep".

Solidification of the external wall 32 results in the solid block 6 being obtained, that is therefore hollow with its wall 32 performing the function of a shell with controlled thickness defining an internal cavity 34 inside which the remaining mix of powders P1 and P2 is contained.

In this manufacturing example, note that the external shell wall 32 can be composed exclusively of material P2, or it can be a mix of powders P1 and P2.

Figure 4A:
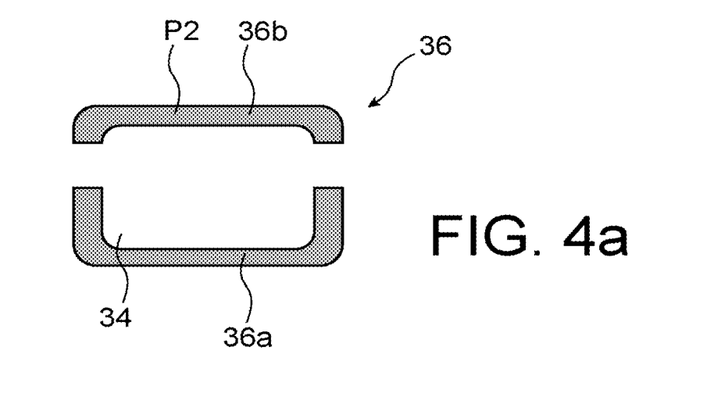
FIGS. 4a to 4c represent different successive steps in a second example of manufacturing a solid block including the powder and the sublimatable material.
Figure 4B:
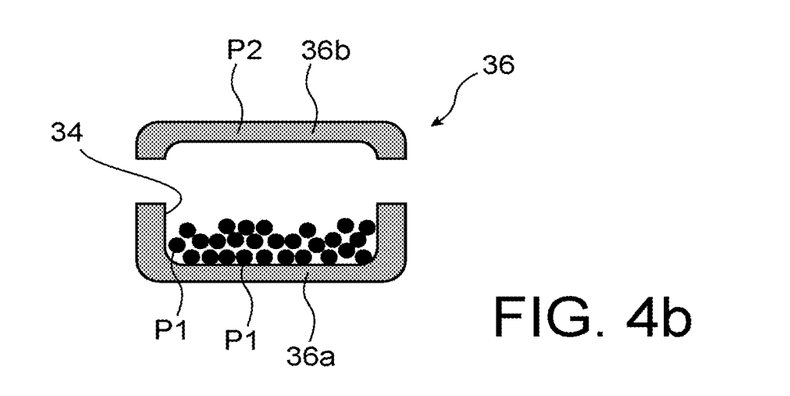
Figure 4C:
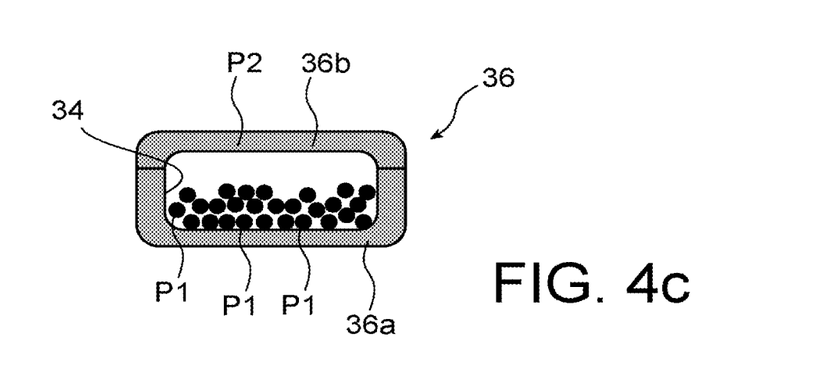

A second example of manufacturing a solid block 6 is shown with reference to FIGS. 4a to 4c. In this second example, the powder P1 and the material P2 satisfy the same criteria as those mentioned in the description of the first example described above.

Manufacturing begins by manufacturing a container 36 using a material P2 in the form of a compacted powder. This container 36 comprises a body 36a defining an internal cavity 34, and a closing element 36b of the internal cavity, this element 36b being in the form of a plug. The two unassembled parts 36a, 36b of the container are shown in FIG. 4a. The powder P1 is then introduced into the internal cavity 34 as shown on FIG. 4b, and the next step is to close the internal cavity 34 using the closing element 36b as can be seen on FIG. 4c. This closing operation can be done by sealing elements 36a, 36b, for example by heating them at their interface and then cooling them to solidify the junction zone.

This example manufacturing process is efficient because the part of the container 36 that will subsequently be sublimated is entirely around its periphery. The sublimation step can thus be done more quickly.

In one alternative embodiment, elements 36a, 36b making up the solid container may be made from a mix of the two powders P1, P2.

Figure 5:
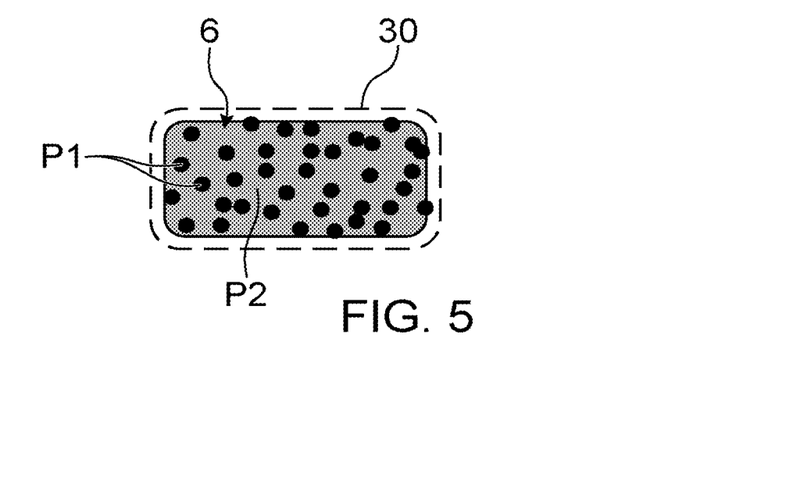
FIG. 5 represents a third example of manufacturing a solid block including the powder and the sublimatable material.

A third example of manufacturing a solid block 6 is shown with reference to FIG. 5. In this third example, the powder P1 and the material P2 satisfy the same criteria as those mentioned in the description of the first example described above.

Manufacturing is begun by bringing the material P2 in liquid form into a receptacle 30 forming a mould. The powder P1 is then poured into this receptacle, that is impregnated by the liquid phase of material P2, by capillarity. Conversely, the powder P1 can be added into the receptacle 30 before the material P2. The two phases are then mixed to obtain a homogeneous assembly.

The material P2 is then cooled so as to obtain the solid block 6 based on material P2 containing powder P1. The block 6 obtained has an external shape making it suitable to be housed directly in the loading space of the additive manufacturing machine.

With this third example embodiment, the powder P1 is perfectly bonded by the material P2. Risks of dissemination of powder P1 are thus very much reduced, even if the solid block 6 should break.

A peripheral wall made of material P2 can be placed around the assembly obtained in FIG. 5, without going outside the framework of the invention.

Figure 6A:
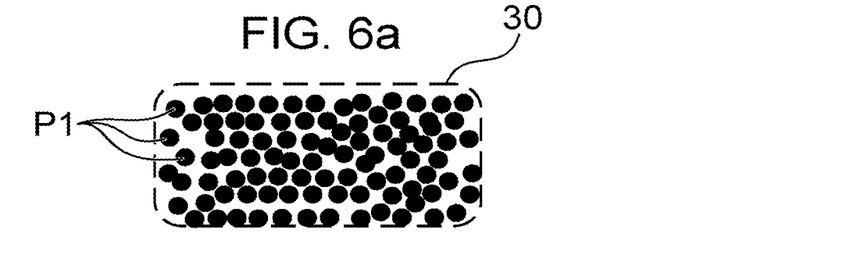
FIGS. 6a and 6b represent different successive steps in a fourth example of manufacturing a solid block including the powder and the sublimatable material.
Figure 6B:
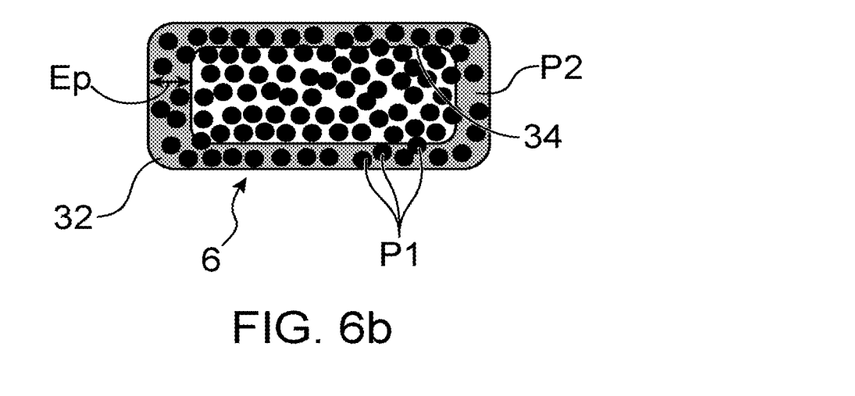

A fourth example of manufacturing a solid block 6 is shown with reference to FIGS. 6a and 6b. In this fourth example, the powder P1 and the material P2 satisfy the same criteria as those mentioned in the description of the first example described above.

Manufacturing begins by putting powder P1 into place at ambient temperature in a receptacle 30 forming a mould, as shown diagrammatically on FIG. 6a. The powder P1 is then impregnated by capillarity around its periphery, by the material P2 brought in liquid form, for a thickness denoted "Ep".

Impregnation is done such that after the peripheral zone in which material P2 is melted has cooled, a solid external wall 32 extends over the given thickness "Ep" identified on FIG. 6b. Solidification of the external wall 32 results in the solid block 6 being obtained, that is therefore hollow with its wall 32 performing the function of a shell with controlled thickness defining an internal cavity 34 inside which the remaining powder P1 is contained. In this fourth manufacturing example, note that the external shell wall 32 can be composed exclusively of a mix of powders P1 and P2. However, a peripheral wall made of material P2 only could be placed around the assembly obtained in FIG. 6b, without going outside the framework of the invention.

Considering FIG. 2 again, the second step E2 in the manufacturing method of the object 20 consists of loading the solid block(s) 6 obtained, into the dedicated loading space of the machine 1. A sublimation step E3 is then carried out, preferably within this loading space, to sublimate the material P2 contained in the sold block 6, and to recover the powder P1 in its initial state before formation of the block 6.

Figure 7:
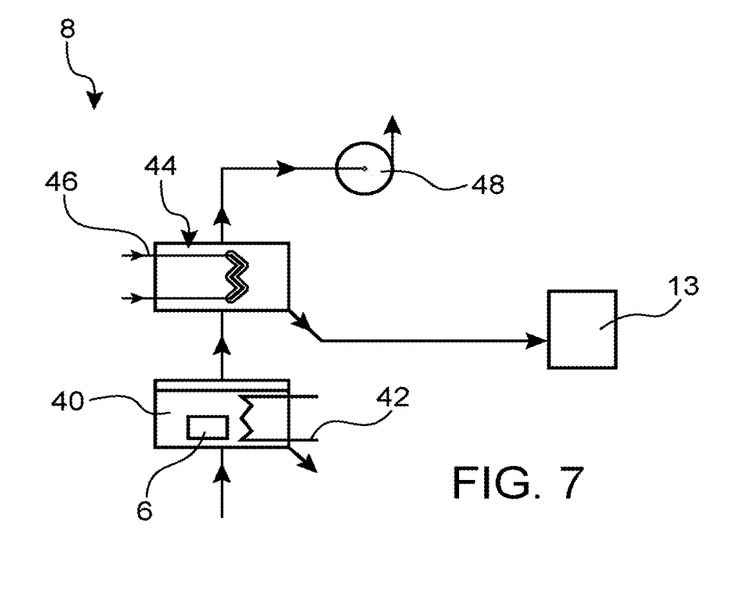
FIG. 7 shows a first example embodiment of means for sublimating the material, these means being used on the machine in FIG. 1.

The sublimation is conventionally done using the above-mentioned means 8, of which a first example embodiment is shown on FIG. 7. These means 8 enable a simple vacuum sublimation, firstly using a sublimation chamber 40 inside which the solid block 6 is placed. As for all sublimation equipment, the chamber 40 is provided with a heating means 42 for heating the block 6. The means 8 also comprise a condenser 44 equipped with a cooling device 46 and a vacuum pump 48 to create a vacuum in the chamber 40 and the condenser 44. With this conventional installation known to an expert in the subject and not described further herein, the material P2 sublimates on the external wall of the condenser 44, and this gas phase is then transferred to means 12 to recover this material P2 by means of a cold trap. The material P2 is recovered in this way by condensation in a step E'3, performed using dedicated means 12. As mentioned above, once recovered in solid form, the material 12 can be used for manufacturing a new solid block 6 and/or for coating the assembly obtained at the end of the method.

Figure 8:
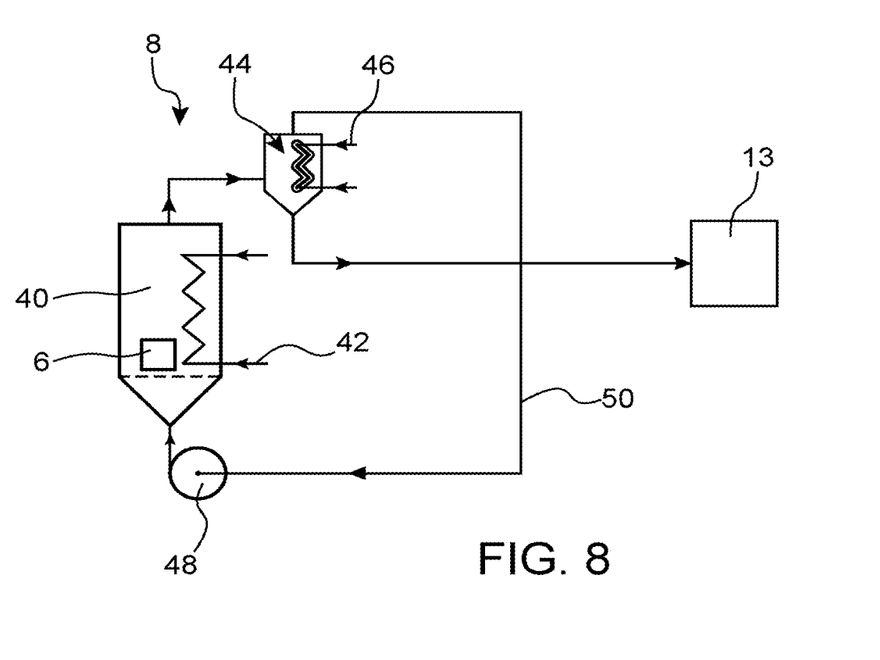
FIG. 8 shows a second example embodiment of means for sublimating the material, these means being used on the machine in FIG. 1.

According to a second embodiment shown on FIG. 8, the means 8 comprise a circuit 50 for the circulation of an inert gas through the different components, identical or similar to those described in the first example and consequently with the same numeric references. The inert gas then acts as a continuously circulating carrier gas such that work can be done at atmospheric pressure and action can be done continuously on the solid block 6. With this technique called entrainment sublimation, the carrier gas is continuously recycled so that no sublimatable material is lost.

Regardless of the selected sublimation technique, the powder P1 is released and recovered by means 12 as the material P2 in the block 6 sublimates. Preferably, it is restored to its powder nature, which is conducive to obtaining a quality object 20. Its restored fluidity (also called "flowability") makes it easy for it to be routed to the additive manufacturing module 10 within which an additive manufacturing step E4 of the object 20 is performed.

Note that separation of elements P1 and P2 obtained by melting or sintering additive manufacturing methods can be complete or only partial. It is quite possible that a small proportion of material P2 (in this case cyclododecane) can remain associated with powder P1 after the separation step. This will be eliminated later by the temperature rise related to the subsequent melting or sintering step. Therefore, under these conditions, the only criterion during separation of powders P1 and P2 is that the necessary and sufficient physical parameters (particularly flowability) of powder P1 are restored so that a layer of it can be formed.

Conventional aspects of additive manufacturing E4 will only be described very briefly. According to a first example embodiment of module 10 shown on FIG. 9, a technique for projection of a binder 60 onto successive layers 62 of powder P1 is applied. This is done by providing the module 10 with a reservoir 64 of powder P1 that acts as a substrate for deposition of the binder. It also comprises a volume 66 of powder that surrounds the manufactured part(s), this volume 66 being composed of successive layers 62.

The module comprises a spray head 68 for the binder 60, and a scraper system 70 for placement of the next layer. Finally, it comprises a tray 72 that supports the entire manufacturing chamber. The manufacturing chamber is supplied by loading the recovered powder P1 into the reservoir 64, in a known manner. After manufacturing has started, the scraper 70 performs left to right sweeping movements in order to collect a volume of powder in the reservoir 64 and then to spread it in a powder bed a few tens of micrometers thick, in the part manufacturing tank. Therefore the support tray 72 starts in the "high" position and for each new layer 62, its position is lowered by an increment so that the scraper can pass and another bed of powder can be formed. For each powder bed thus formed, a part is solidified by addition of the binder 60. The object 20 is manufactured layer by layer, and will finally be surrounded by unbonded powder P1.

Figure 10:
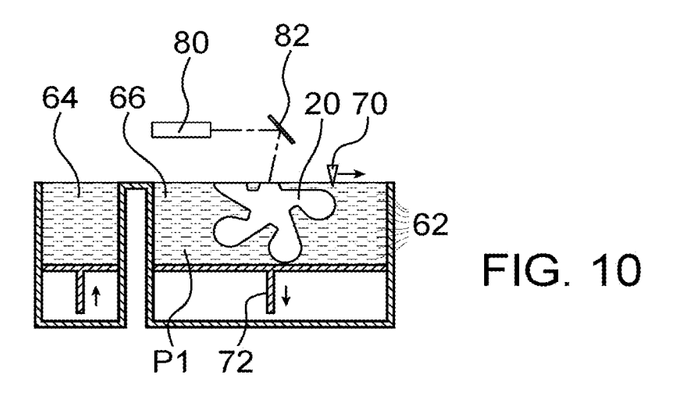
FIG. 10 shows a second example embodiment of an additive manufacturing model installed on the machine in FIG. 1.

The second example embodiment illustrated on FIG. 10 is different from the first in that the technique used is selective laser melting or electron beam melting, or selective laser sintering or electron beam sintering. In both cases, the principle is to melt or sinter the powder bed by a laser beam or electron beam 80, preferably using one or more galvanometric mirrors 82.

The next step in the method shown diagrammatically on FIG. 2 is step E5 to completely or partially coat the assembly 16 containing the object 20 and the unbonded powder P1. As mentioned above, this coating step E5 is done using special-purpose means 14 from a given quantity of material P2, obtained from recovery means 13 and/or an external input to obtain a "new" material.

The support tray 72 is moved upwards so that the assembly 16 projects out of the manufacturing tank, to coat the assembly 16 in an operation also called partial or total encapsulation. As shown diagrammatically on FIG. 11, a peripheral well 90 of material P2 is applied to the external surface of the assembly 16 as it comes out of the tank. This peripheral wall 90 thus takes the form of a partial or total capsule, sufficiently thick so that the encapsulated assembly can be moved at no risk. However, the material P2 applied to the external surface of the moving assembly 16 is preferably changed to the liquid state after heating, so as to impregnate the powder P1 by capillarity. This enables an application in the liquid phase by spraying drops using appropriate equipment 94, or even direct application in which the liquid phase of the material P2 is poured directly and continuously on the assembly 16 from a dedicated reservoir (not shown). Another alternative embodiment consists of applying the material P2 using a spray or as an inkjet to vaporise or project fine droplets onto the outside surface of the assembly 16.

Figure 11:
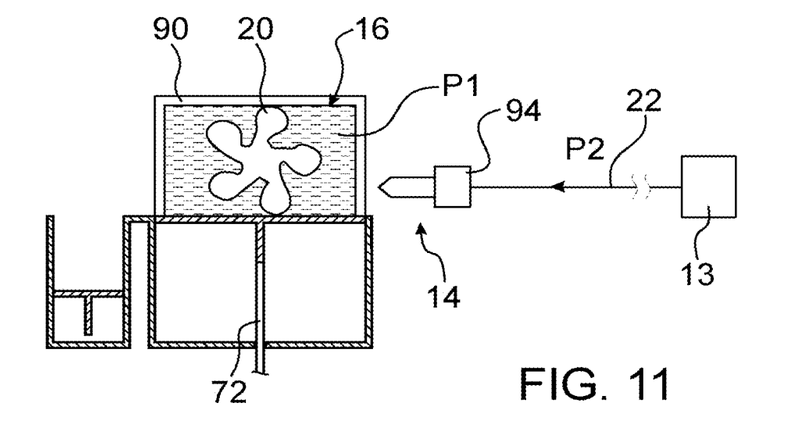
FIG. 11 shows an example embodiment of means for coating the assembly including the manufactured object and the unbonded powder surrounding it, these means being installed on the machine in FIG. 1.

In the example on FIG. 11, the peripheral wall 90 made of material P2 extends all around the periphery of the assembly 16, except for its lower face directly in contact with the support tray 72. In this case, the coated assembly 16 can then be moved to another workstation masking the uncoated face of this assembly, or even keeping this assembly 16 forced into contact on the support tray 72 as far as this other workstation. However, it would also be possible to put another solid initial layer made of material P2 on the bottom of the manufacturing tank in contact with the support tray 72, so as to finally obtain total encapsulation of the assembly 16.

After the coated assembly 16 has been extracted from the machine 1, the manufacturing method is completed by step E6 to extract the object 20. This step E6 is implemented after the coated assembly 16 has been placed on another workstation, preferably in a glovebox (not shown). The first operation during this step E6 is to remove the coating 90, that can then be recovered to manufacture a new solid block 6. At this stage, the object 20 is surrounded by unbonded powder P1. Therefore this step consists of removing the unbonded powder by suction or dusting and then recovering the support tray 72 on which the object has been progressively built, when the tray has been moved with the coated assembly 16 in the glovebox.

Obviously, an expert in the subject can make various modifications to the invention as it has just been described through non-limitative examples.

The invention claimed is:

1. An additive manufacturing method for an object using at least one powder contained in a solid block along with a sublimatable material, the method comprising the following steps in succession:
    (1) loading the solid block in a loading space of an additive manufacturing machine;
    (2) sublimating a portion of said sublimatable material present in the solid block and recovering a portion said at least one powder released by the sublimating; and
    (3) additive manufacturing the object by stacking successive layers made using the at least one powder recovered in step (2).

2. The additive manufacturing method according to claim 1, further comprising, after said step (3), recovering a portion of the sublimated material sublimated in step (2) using a cold trap.

3. The additive manufacturing method according to claim 1, wherein said sublimatable material is cyclododecane.

4. The additive manufacturing method according to claim 1, further comprising manufacturing the solid block by:
    mixing said at least one powder and a portion of said sublimatable material so as to obtain a non-powdery material;
    compacting the non-powdery material at ambient temperature;
    melting a portion of said sublimatable material on an external surface of the compacted non-powdery material, so as to obtain a solid external wall of the solid block with a given thickness after cooling.

5. The additive manufacturing method according to claim 1, further comprising manufacturing the solid block by:
    making a container using said sublimatable material, said container comprising a body defining an internal cavity and an element to close said internal cavity;
    introducing the at least one powder into the internal cavity;
    closing the internal cavity using said closing element.

6. The additive manufacturing method according to claim 1, further comprising manufacturing the solid block by:
    bringing said sublimatable material in liquid form into a mould and then pouring the at least one powder into the mould containing said sublimatable material in liquid form, or vice versa;
    cooling said sublimatable material so as to obtain the solid block of material containing the at least one powder.

7. The additive manufacturing method according to claim 1, further comprising manufacturing the solid block by:
    placing the at least one powder in a mould;
    impregnating the at least one powder around a periphery of the mould, using a material in liquid form to a given thickness, so as to obtain a solid external wall of the solid block after cooling over said given thickness.

8. The additive manufacturing method according to claim 1, wherein said additive manufacturing step of the object is done using one of the following techniques:

selective laser melting or electron beam melting;
selective laser sintering or electron beam sintering; and
projecting a binder on successive layers of the portion of the at least one powder released by the step (2).

9. The additive manufacturing method according to claim 1, wherein said powder is chosen from among:
metallic powders;
organic powders; and
inorganic powders.

10. The additive manufacturing method according to claim 1, wherein the at least one powder comprises at least one of a titanium alloy, an aluminium alloy, a nickel alloy, a superalloy, steel, stainless steel, a refractory metal, a precious metal, a pure metal or an alloyed metal.

11. The additive manufacturing method according to claim 1, wherein the at least one powder comprises at least one of polyether block amide, polystyrene, polyetheretherketone (PEEK), polyaryletherketone (PAEK), and a polyamide containing aluminum.

12. The additive manufacturing method according to claim 1, wherein the at least one powder comprises at least one of quartz, ceramic, and calcium sulphate.

13. The additive manufacturing method according to claim 1, further comprising a step (4), after the additive manufacturing step, of at least partially coating an assembly composed of unbonded powder and the object surrounded by the unbonded powder, the coating being made by a sublimatable material.

14. The additive manufacturing method according to claim 13, further comprising, after the coating step (4):
extracting and transferring the coated assembly from the additive manufacturing machine to another work station for extraction of said object.

15. The additive manufacturing method according to claim 13, wherein the coating is made using at least some of said material recovered during step (2).

16. The additive manufacturing method according to claim 13, wherein the coating is made using all of said material recovered during step (2).

17. The additive manufacturing method according to claim 13, wherein a sub-portion of said sublimated material sublimated in step (2) is applied around said assembly in a liquid state so as to impregnate by capillarity a portion of the at least one powder recovered in step (2).

18. The additive manufacturing method according to claim 17, wherein the application comprises direct application of the sub-portion of said sublimated material.

19. The additive manufacturing method according to claim 17, wherein the application comprises sprinkling the sub-portion of said sublimated material.

20. The additive manufacturing method according to claim 17, wherein the application comprises spraying the sub-portion of said sublimated material around said assembly.

* * * * *